United States Patent [19]
Hawkins

[11] 3,788,064
[45] Jan. 29, 1974

[54] SYSTEM FOR DRIVING HEAT MOTOR
[76] Inventor: Robert D. Hawkins, 2126 Raven Rd., Pleasanton, Calif. 94566
[22] Filed: Jan. 26, 1972
[21] Appl. No.: 220,818

[52] U.S. Cl. .................................. 60/36, 60/65
[51] Int. Cl. .................................... F01k 25/00
[58] Field of Search ........ 60/1, 36, 59, 59 T, 64, 65

[56] References Cited
UNITED STATES PATENTS
| | | | |
|---|---|---|---|
| 3,512,358 | 5/1970 | Schmidt | 60/36 |
| 3,636,706 | 1/1972 | Minto | 60/36 |
| 3,090,208 | 5/1963 | Munakata | 62/5 |

FOREIGN PATENTS OR APPLICATIONS
1,020,646   12/1957   Germany ................ 60/36

*Primary Examiner*—Martin P. Schwadron
*Assistant Examiner*—Allen M. Ostrager
*Attorney, Agent, or Firm*—Lowe & King

[57] ABSTRACT

A heat engine having a shaft output is connected to a vortex separating means, such as a bank of Ranque tubes, for deriving first and second gas flows respectively having higher and lower temperatures than input gas to the vortex separating means. The heat engine and a high temperature heat exchanger are in a first feedback loop responsive to the first gas flow. A second feedback loop, responsive to the second flow from the bank of vortex tubes, includes a low temperature heat exchanger responsive to scavenged or rejected heat of the system. The first feedback loop may include a second bank of vortex tubes which feeds hot and cold gases to a heat exchanger and vapor generator, respectively. The gases fed to the heat exchanger and vapor generator, after passing through them, are condensed. The condensed gas is fed to the vapor generator and heat exchanger to the heat engine. The heat engine may be, e.g., a simple gas turbine or a compound turbine.

19 Claims, 5 Drawing Figures

PATENTED JAN 29 1974 3,788,064

---- TORQUE
⇒ LIQUID FLOW
⇒ HEAT FLOW
— GAS FLOW

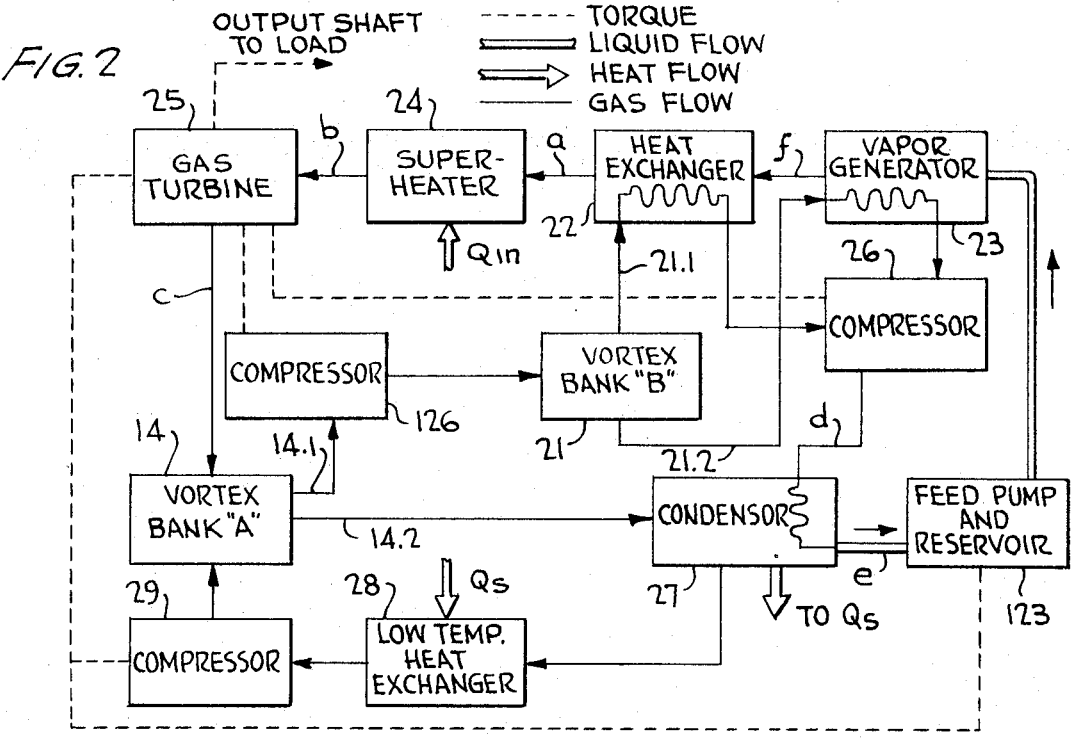
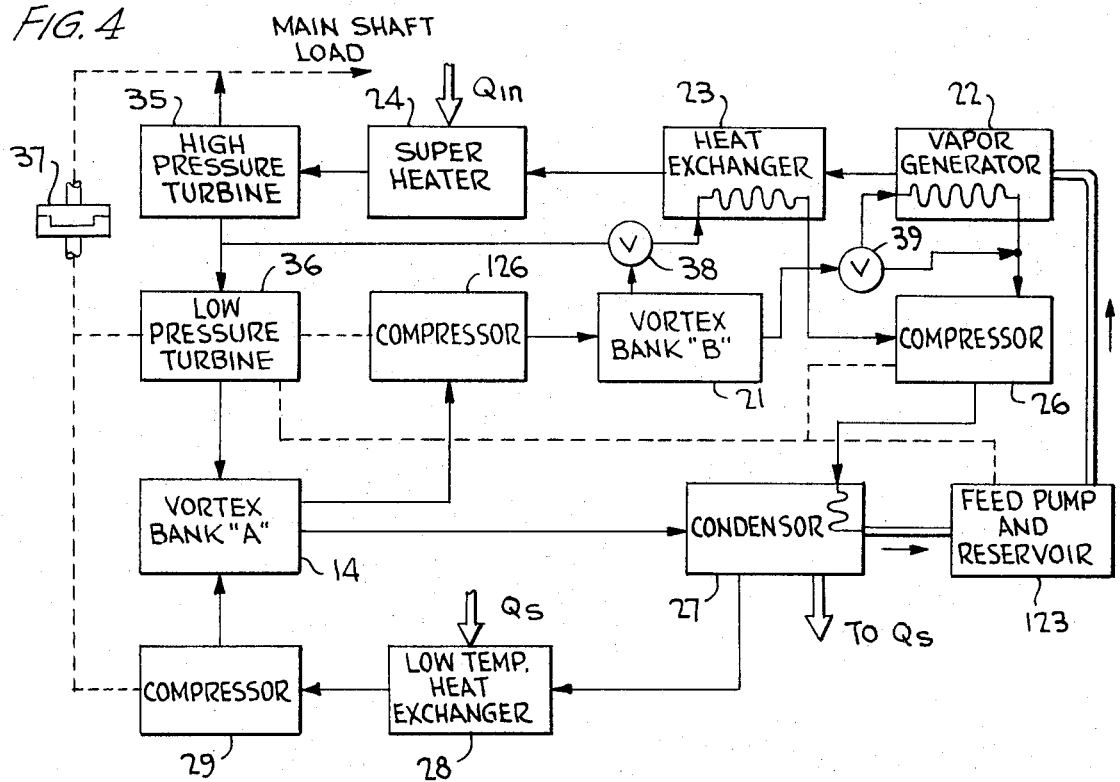

SYSTEM FOR DRIVING HEAT MOTOR

FIELD OF THE INVENTION

The present invention relates generally to systems for driving heat engines having output shafts, and more particuarly, to such systems wherein a pair of feedback loops are provided in combination with vortex tube gas separating means.

BACKGROUND OF THE INVENTION

In most presently available systems including a heat engine having an output shaft, such as a gas turbine, system working fluid effluent from the engine is of generally low temperature and pressure. The effluent generally has high enthalpy but is not utilized to perform additional work. Instead, the temperature of the effluent is generally lowered so that the gas is condensed to a smaller volume, that is more readily handled than the gaseous effluent. After being condensed, the liquid of a recirculating system is reheated and fed back as the high pressure, high temperature gaseous input that drives the heat engine. In a typical system, the latent heat of vaporization resulting from condensing the gas effluent to a liquid has been ignored and wasted, thereby reducing the efficiency of the system.

BRIEF DESCRIPTION OF THE INVENTION

In accordance with the present invention, the enthalpy of system working fluid effluent derived from a heat engine is employed to provide additional energy that assists in driving the engine. This result is achieved by feeding the heat engine effluent, in gaseous form, to a vortex means for separating input gases thereto into a pair of relatively low pressure flow components respectively having higher and lower temperatures than the input flow. The vortex means preferably comprises a number of Ranque vortex tubes, of the type disclosed in United States Pat. No. 1,952,281. The vortex tubes are connected to each other so that significant flows can be handled and to provide the required temperature differences between the input gas flow and the two output gas flows. The higher temperature output gas flow derived from the vortex means is fed, via a first feedback loop, as the high temperature, high pressure gaseous input to the heat engine, and thence back to an inlet of the vortex means. The lower temperature output flow of the vortex means is fed via a second feedback loop back to the vortex means input. The first and second feedback loops include separate heat exchangers. The heat exchanger of the first feedback loop is responsive to heat derived from an external source of energy while the heat exchanger of the second feedback loop is responsive to heat scavenged from the remainder of the system. By energizing the heat exchanger of the second feedback loop with scavenged heat, efficiency of the system is enhanced.

A second bank of vortex tubes may be provided in the first feedback loop to provide relatively hot gas flows for vaporizing and heating the system working fluid after it has been condensed into a liquid. To enhance efficiency further the latent heat of vaporization, derived by condensing the working fluid from a gas into a liquid, is supplied as one of the scavenged heat inputs to the heat exchanger of the second feedback loop.

The heat engine can be of any suitable type, such as a simple or compound turbine. If the heat engine is a compound turbine, i.e., one having a first, high pressure stage and a second, low pressure stage, the system configuration can be selectively altered so that for light loads only the low pressure turbine stage is responsive to lower temperature and pressure gases derived in the first feedback loop. Hence, the efficiency of the system is enhanced for light loads.

It is, accordingly, an object of the present invention to provide a new and improved system for driving heat engines having shaft outputs.

A further object of the present invention is to provide a new and improved system wherein a heat engine is driven by gases heated, to a certain extent, by heat scavenged from the remainder of the system.

A further object of the invention is to provide a new and improved system wherein the effluent from a heat engine is utilized to perform additional work for assisting the engine drive.

An additional object of the invention is to provide a new and improved system wherein the latent heat of vaporization of gases condensed into a liquid is utilized to assist in driving a heat engine.

A further object of the invention is to provide a system wherein a vortex means is employed in a highly efficient system for driving a heat engine.

Yet another object of the invention is to provide a new and improved system for more efficiently driving a compound turbine system.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 2 is a block diagram of a second, more practical embodiment of the invention, wherein a vortex gas separating means is provided in a feedback loop;

FIG. 4 is a block diagram of an embodiment of the invention wherein a compound turbine is driven in accordance with the present invention.

DETAILED DESCRIPTION OF THE DRAWING

Figure 1:
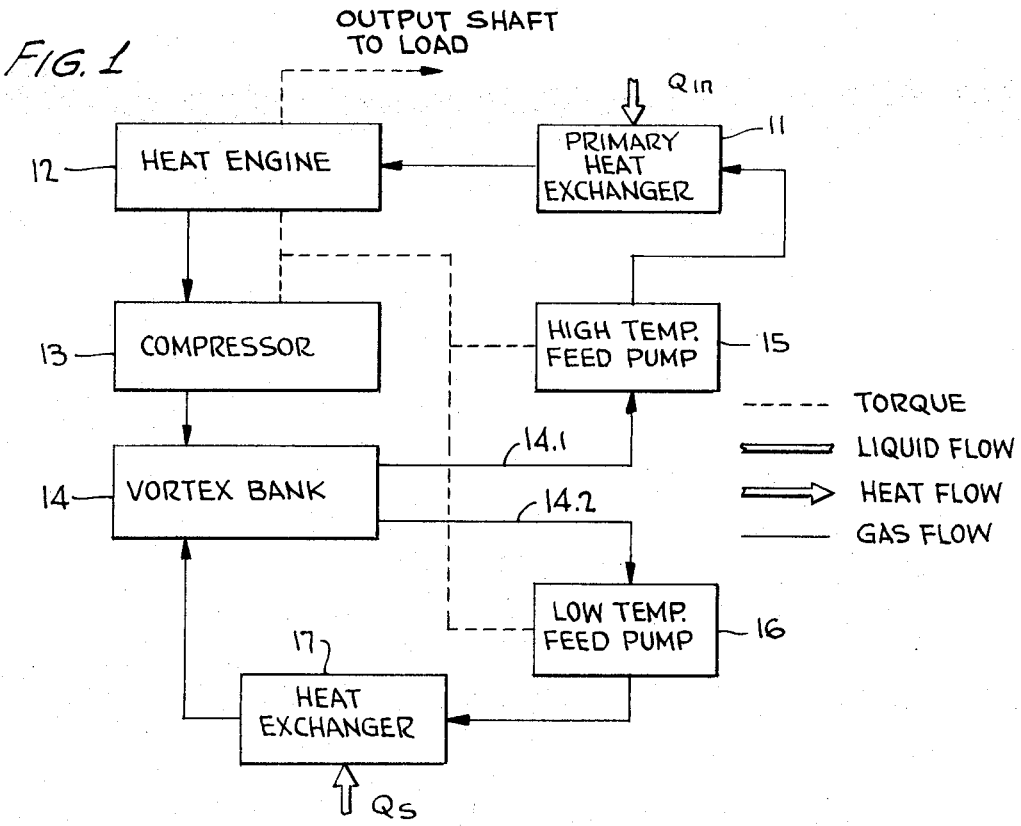
FIG. 1 is a block diagram of one embodiment of the invention, to show the basic principles thereof.

Reference is now made to FIG. 1 of the drawing wherein heat engine 12, having a shaft output, is driven by high temperature, high pressure gases derived from primary heat exchanger 11. Heat exchanger 11 is responsive to heat from an external, high temperature source, $Q_{IN}$, that supplies input energy to the system. Effluent from heat engine 12, gas having a relatively high enthalpy, but of relatively low temperature and pressure, is fed to adiabatic compressor 13 that feeds relatively high pressure gas to a vortex means 14. Vortex means 14 separates input gases thereto into first and second output gas flow components, having approximately the same pressures.

The vortex means 14 preferably comprises a number or bank of Ranque tubes arranged to handle the required flow and to provide the desired temperature. Each Ranque tube includes an inlet for creating a centrifugal field in the tube and a pair of outlets arranged so that at one of the outlets the temperature of the gas is higher than the inlet gas and at the other outlet the gas temperature is lower than the inlet gas. In a typical embodiment, the gas fed into vortex bank 14 has a pressure of approximately 7 atmospheres and a temperature of approximately 540°R. 80 percent, by volume, of the inlet gas is fed to high temperature outlet line 14.1, at a pressure of approximately 1 atmosphere and temperature of approximately 620°R. The remainder of the input gas to vortex bank 14, approximately 20 percent by volume, is supplied to cold outlet line 14.2 with a pressure of approximately 1 atmosphere and a temperature of approximately 470°R. Vortex bank 14 is operated so that the fluid therein is always maintained in a gaseous, and never in a liquid, state to prevent detrimental effects to the vortex tubes due to cavitation thereof by the liquid. For maximum efficiency, it is desirable to lower the fluid temperature as much as possible in the Ranque tubes, however. Hence, the system working fluid in the exemplary system is preferably a refrigerant fluid that is maintained in a gaseous state at temperatures less than the freezing point of water. It is to be understood that various substances may be utilized as the working fluid of the system, dependent upon the anticipated thermal environment of the system. In general, it is preferable to use Freon, a fluoride carbon compound possessing a low specific heat and low latent heat of vaporization. In particular, Freon 12 (dichlorddifluormethane) is believed a preferable working fluid because it has the most stable compound for the normal ambient environmental temperatures of between $-20°F.$ to $-100°F.$ It is to be understood, however, that the working fluid should be tailored to the particular application and can be any suitable gas or vapor producing compound that is stable between the boiling point thereof and the highest expected temperature in the system it is to serve.

Gas in outlet lines 14.1 and 14.2 is recirculated in first and second feedback loops back to the input of vortex bank 14. The first feedback loop includes primary heat exchanger 11, heat engine 12 and compressor 13, as well as high temperature feed pump 15. Feed pump 15 responds to the high temperature gas in line 14.1 to increase the pressure thereof so that the gas enters heat exchanger 11 with a substantially higher than atmospheric pressure. In heat exchanger 11, the high pressure gas from the pump 15 is increased in temperature by external heat energy, $Q_{IN}$, applied to the heat exchanger so that high temperature, high pressure gas flow is supplied by the heat exchanger 11 to heat engine 12. The shafts of compressor 13 and high temperature feed pump 15 in the first feedback loop are driven by the shaft output of heat engine 12. The output shaft of heat engine 12 is primarily utilized to drive an external engine or generator, that forms the primary load for the system of the present invention.

The primary load driven by the shaft output of heat engine 12 may be an electrical induction machine utilized as a motor or generator of a vehicle. The induction machine functions as a motor in response to the electrical energy from a battery to drive wheels of the vehicle. It also can function as a generator to supply current to the battery of the vehicle while no drive for the vehicle wheels is required or during periods of regenerative braking. In another application, heat engine 12 can drive a synchronous generator that generates a.c. power fed to an electrical load that can also be selectively driven by an external electric generator.

The second feedback loop, responsive to the gas flow in line 14.2, comprises low temperature feed pump 16 which is directly responsive to the gas in line 14.2 and low temperature heat exchanger 17, responsive to effluent from heat pump 16. The shaft of feed pump 16 is driven by the output shaft of heat engine 12. Heat exchanger 17 is preferably powered by heat scavenged from the remainder of the system to achieve high operating efficiency. To this end, the system, except for heat exchanger 17, is preferably located in a refrigerator and heat withdrawn from the refrigerator is utilized as the heat input source, $Q_S$, of heat exchanger 17.

Gas derived from heat exchanger 17 is combined in vortex bank 14 with a gas fed to the vortex bank by compressor 13. Since it is desirable for the two input components to vortex bank 14, from the first and second feedback loops, to have approximately the same pressure, feed pump 16 increases the pressure of the gas in the low temperature, second feedback loop to approximately 7 atmospheres. The gases fed into vortex bank 14 from the first and second feedback loops are combined and then separated into high and low temperature components, as described supra.

Reference is now made to FIG. 2 of the drawing wherein the system of FIG. 1 is modified so that a second vortex means for separating input gas flow into high and low temperature output gas flows is included in the first feedback means. The second vortex means is a bank of vortex tubes connected in a similar manner as described supra with regard to vortex bank 14. The high and low temperature gas flows respectively derived by vortex bank 21 in lines 21.1 and 21.2 are fed as relatively hot input gases to heat exchanger 22 and vapor generator 23, respectively. Vapor generator 23 heats working fluid supplied thereto by feed pump and reservoir 123 so that the effluent from the vapor generator is a gas and liquid mixture that is coupled to heat exchanger 22, which is connected in seriatim with the vapor generator. The vapor supplied to heat exchanger 22 is heated additionally, so that the output flow of the heat exchanger is substantially gaseous, with only possibly a small amount of vapor. The output flow of heat exchanger 22 is completely converted to the gaseous state by superheater 24, a heat exchanger in seriatim with heat exchanger 22 and responsive to an external heat source, $Q_{IN}$, which supplies the system input energy. Hot gas derived from superheater 24 is fed as high pressure, high temperature input gas to gas turbine 25, the heat engine of the FIG. 2 system. The high enthalpy, but relatively low temperature and pressure effluent from gas tubrine 25 is fed to vortex bank 14. To provide efficient operation of vortex bank 21, the hot gases of the first feedback loop, after leaving vortex bank 14, are compressed by compressor 126, which is interposed between line 14.1 and the inlet of vortex bank 21.

The first feedback loop is completed by feeding the output gas flow of vortex bank 21, in lines 21.1 and 21.2, to compressor 26, after the gases in these lines have been cooled in heat exchanger 22 and vapor generator 23. In compressor 26, the cooled gases derived from vapor generator 23 and heat exchanger 22 are combined and compressed, and thence fed as a high pressure gas to an inlet of condenser 27. Condenser 27 is also responsive to the relatively low temperature gas derived from vortex bank 14 in line 14.2 Condenser 27 transforms the gas flowing from compressor 26 into a liquid that is fed to feed pump and reservoir 123 and is recirculated by the feed pump to vapor generator 23. Some latent heat of vaporization given off by the gas condensed by condenser 27 is fed as a scavenged input heat component to low temperature heat exchanger 28 of the second feedback loop.

The second feedback loop includes a flow path from line 14.2 to heat exchanger 28 through condenser 27. Some of the latent heat of vaporization given off by the fluid condensed by condenser 27 heats the gas in line 14.2 prior to the gas being fed to heat exchanger 28. Relatively high temperature gas derived from heat exchanger 28 is fed to compresser 29 which feeds gas, having substantially the same pressure as the effluent from gas turbine 25, to vortex bank 14. In vortex bank 14, the gas from turbine 25 and compressor 29 is combined in the manner indicated with regard to FIG. 1.

The devices of the FIG. 2 system requiring shaft input drives are driven by the output shaft of gas turbine 25. To this end, the shafts of compressors 26, 29 and 126, and the pump of feed pump and reservoir 123 are mechanically coupled to the output shaft of gas turbine 25.

Figure 3A:
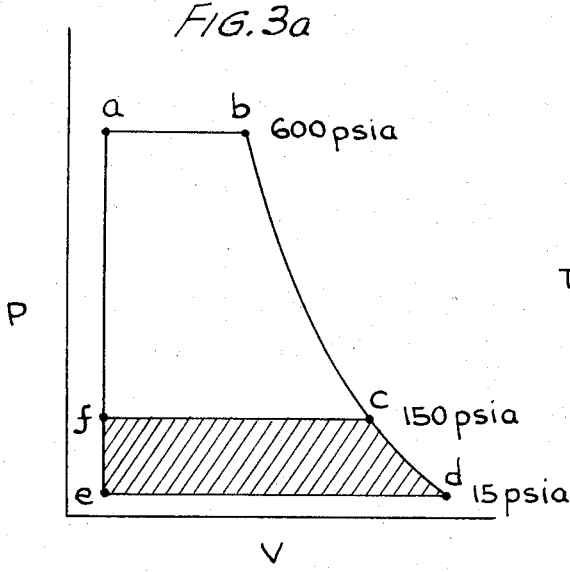
FIGS. 3A and 3B are state diagrams utilized to describe the operation of the system of FIG. 2.
Figure 3B:
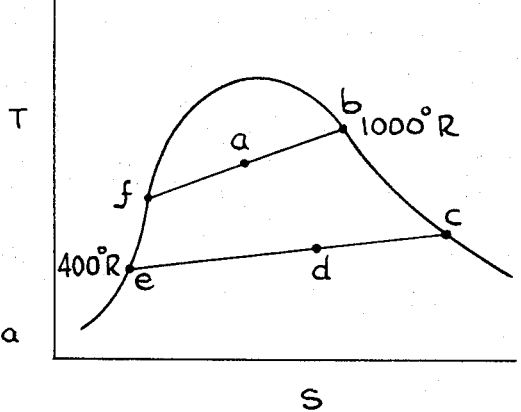

To provide a more complete analysis of the operation of the system of FIG. 2, reference is made to the pressure versus volume (P-V) and temperature versus entropy (T-S) state diagrams of FIGS. A and 3B, respectively. The state diagrams of FIGS. 3A and 3B represent theoretical curves not attainable with a practical, actual working system. The curves, however, are instructive to provide an analysis of system operation. It is to be understood that the temperatures and pressures of the state diagrams are exemplary, to provide the reader with a typical set of pressure and temperature circumstances. The points A-F on these state diagrams correspond with points of similar nomenclature on output lines of the system illustrated in FIG. 2.

To describe system operation, assume that the working fluid in the system is vapor fed by vapor generator 23 to heat exchanger 22, point A on the P-V and T-S state diagrams. In heat exchanger 22 and superheater 24, the vapor is isobarically heated at a pressure of approximately 600 p.s.i.a. from a temperature of approximately 700°R. to a temperature of approximately 1,000°R., so that the system working fluid is completely gaseous, and is possibly superheated as it leaves superheater 24. The high temperature, high pressure gases fed by superheater 24 to gas turbine 25 emerge from the gas turbine as gaseous effluent having a relatively large volume, low pressure of approximately 150 p.s.i.a., and a temperature of approximately 500°R., as indicated by state point C. The gas effluent from turbine 25 is combined in vortex bank 14 with gaseous effulent from compressor 29, which has a temperature significantly greater than the gas turbine effluent, and approximately the same pressure. These flows are combines in vortex bank 14 to produce a combined flow having a temperature approximately 100°R. greater than the temperature of the gas effluent from turbine 25. Vortex bank 14 separates the combined flow into approximately atmospheric hot and cold flows, respectively having temperatures approximately 100°R. greater and 140°R. less than the combined flow. The cold gas in line 14.2 is isobarically heated in condenser 27 and heat exchanger 28. The gas flowing from heat exchanger 28 is isothermally compressed in compressor 29 so that it has a pressure of approximately 150 p.s.i.a.

The pressure in hot flow line 14.1 is increased isothermally by compressor 126 to enable vortex bank 21 to operate efficiently. The high temperature output flow of vortex bank 21 is approximately at atmospheric pressure, but at a temperature approximately 100°R. above the temperature of the gas in line 14.1. The low temperature gas flow derived from vortex bank 21, in line 21.2, is also approximately at atmospheric pressure, at a temperature approximately 60°R. less than the gas in line 14.1.

The gases in high and low temperature lines 21.1 and 21.2, after giving off heat in heat exchanger 22 and vapor generator 23 respectively, are passed through compressor 26, which has an effluent at slightly greater than atmospheric pressure of 15 p.s.i.a. and a temperature of approximately 460°R., as indicated by state point D. The low pressure, low temperature effluent of compressor 26 is reduced in temperature further in condenser 27 and isobarically converted to a lower volume liquid having a temperature of approximately 400°R., as indicated by state point E. The pressure of the liquid is increased, without changing the liquid volume in the pump section of pump and reservoir 123, so that effluent from the pump has a pressure of approximately 150 p.s.i.a. The liquid is maintained at 400°R. until it is within vapor generator 23. In vapor generator 23, the liquid gains heat and is vaporized to a temperature of approximately 600°R. Fluid leaves vapor generator 23 and thence is admitted to primary heat exchanger 22, where it gains heat so that its temperature rises to about 700° R. From heat exchanger 22, fluid is transferred to superheater 24, where it receives its final heat load and the temperature rises to approximately 1,000°R. The liquid flows from pump and reservoir 123 to vapor generator 23, which increases the temperature and pressure of the liquids, at constant volume, so that effluent from the vapor generator is a high pressure and relatively high temperature vapor, as indicated at state point A. The cycle is thereafter repeated in the manner stated.

Reference is now made to FIG. 4 of the drawing wherein there is illustrated a modification of the system of FIG. 2, particularly adapted to drive a compound turbine, including a high pressure turbine stage 35 and a low pressure turbine stage 36. Turbine stages 35 and 36 are cascaded with each other so that effluent from turbine stage 35 drives low pressure turbine stage 36. The output shafts of turbine stages 35 and 36 are selectively interconnected with each other by clutch 37, depending upon the power requirements of a load being driven.

Low pressure, low temperature effluent from low pressure turbine 36 is fed directly to vortex bank 14, where it is combined with gas from the second feedback loop in the same manner as described with regard to FIG. 2. The feedback loops of FIGS. 2 and 4 are identical, except for valving which selectively connects high and low temperature flows from vortex bank 21 to the inlet of low pressure turbine 36 and directly to compressor 26, when high pressure turbine 35 is in an idle condition. Because high pressure turbine 35 may be in an idle condition, depending upon the requirements of its shaft output, the low pressure turbine is utilized to drive the various elements of the system requiring a shaft input, viz: compressors 26, 29 and 126, and the pump of feed pump and reservoir 123.

With high pressure turbine 35 in a drive condition, i.e., not idling, it is driven in response to high temperature, high pressure gases derived from superheater 24 in the same manner as gas turbine 25 of FIG. 2. With high pressure turbine 35 in an idle condition, the first feedback loop is modified so that high temperature output flow of vortex bank 21 is coupled to an inlet of low pressure turbine 36, rather than as a hot gas to heat exchanger 22. In addition, the low temperature output flow of vortex bank 21 is fed directly to compressor 26, rather than as hot gases to vapor generator 23. To these ends, two - way valves 38 and 39 are provided. Each of valves 38 and 39 includes an inlet port and a pair of outlet ports, only one of which is at any time selectively connected to the inlet port. Valves 38 and 39 are operated in synchronism so that input flows to the valves are directed to heat exchanger 22 and vapor generator 23, respectively, while the shaft of high pressure turbine 35 is required to power a load When the system is operated in a "power down" or standby condition, whereby high pressure turbine 35 idles, valves 38 and 39 are synchronously activated so that the inlet of valves 38 and 39 are connected to low pressure turbine 36 and compressor 26, respectively.

While there have been described and illustrated several specific embodiments of the invention, it will be clear that variations in the details of the embodiments specifically illustrated and described may be made without departing from the true spirit and scope of the invention as defined in the appended claims. I claim:

1. A system for driving a heat engine with high temperature, high pressure inlet gas, comprising a heat engine having an output shaft, said engine converting the gas supplied thereto to an effluent having lower temperature and pressure than the inlet gas, vortex tube means for separating gas supplied to an inlet thereof into a high temperature first output gas flow and a low temperature second output gas flow, means for heating the first gas flow and supplying the heated first gas flow as the inlet gas to the engine, means for feeding the load effluent as the gas supplied to the inlet of the vortex means, heat exchanger means for increasing the temperature of the second gas flow, and means for supplying the gas emerging from the heat exchanger means as a gas supplied to the vortex means at substantially the same pressure as the pressure of the gas supplied to the vortex means by the feeding means.

2. A system for driving a heat engine with high temperature, high pressure inlet gas, comprising a heat engine having an output shaft, said engine converting the gas supplied thereto to an effluent having lower temperature and pressure than the inlet gas, vortex tube means for separating gas supplied to an inlet thereof into a high temperature first output gas flow and a low temperature second output gas flow, first feedback means for feeding the first flow back to an inlet of the vortex means, the flow of said first feedback means including the inlet gas and effluent of said engine, said second feedback means feeding the second flow back to an inlet of the vortex means, said first and second feedback means including heat exchanger means for increasing the temperature of the gas fed thereto.

3. The system of claim 2 wherein the heat exchanger means of the second feedback means heats the second flow in response to heat scavenged from other parts of the system.

4. The system of claim 2 wherein the first feedback means includes means for condensing the first output flow of the vortex means into a liquid, another heat exchanger means for heating the fluid condensed by the condensing means, and means for supplying the fluid emerging from the another heat exchanger as inlet gas for the engine.

5. The system of claim 4 wherein the second feedback means includes a flow path through the means for condensing whereby the gas in the second feedback means is heated in the means for condensing by the latent heat of vaporization of the condensed fluid.

6. The system of claim 2 wherein the first and second feedback means include means for supplying gases having substantially the same pressure to the vortex means inlet.

7. A system for driving a heat engine with high temperature, high pressure inlet gas, comprising a heat engine having an output shaft, said engine converting the gas supplied thereto to an effluent having a lower temperature and pressure than the inlet gas, first and second vortex tube means, each of said vortex means separating gas supplied to an inlet thereof into a high temperature first output gas flow and a low temperature second output gas flow, first feedback means for feeding the first flow of the first vortex means back to an inlet of the first vortex means, the flow of said first feedback means including the inlet and effluent of said heat engine, as well as inlet gas and first and second output flows of said second vortex means, second feedback means for feeding the second flow of the first vortex means back to an inlet of the first vortex means, said first and second feedback means including heat exchanger means for increasing the temperature of the gas fed thereto.

8. The system of claim 7, wherein the first feedback means includes: means for condensing the output flows derived from said second vortex means into a liquid, another heat exchanger means for heating the fluid condensed by the condensing means, said another heat exchanger means being heated by output flow from the second vortex means, and means for supplying the fluid emerging from the another heat exchanger as the inlet gas for the engine.

9. The system of claim 8, wherein the another heat exchanger means includes, in seriatim, a vapor generator responsive to said liquid and a heat exchanger, and means for respectively heating the vapor generator and heat exchanger with said second and first flows derived from the second vortex means.

10. The system of claim 9, wherein the first feedback means includes a compressor responsive to said flows from the second vortex means after they have passed through the heat exchanger and vapor generator, and means for feeding gas effluent from the compressor to the condensing means.

11. The system of claim 10, wherein the second feedback means includes a flow path through the means for condensing, whereby the gas in the second feedback means is heated in the means for condensing by the latent heat of vaporization of the condensed fluid.

12. The system of claim 11 wherein the heat exchanger means of the second feedback means heats the second flow of the first vortex means in response to heat scavenged from the remainder of the system.

13. The system of claim 9, wherein the heat engine is a compound machine having a high pressure section responsive to gas derived from the heat exchanger and a low pressure section responsive to effluent from the high pressure section, means for feeding the first flow derived from the second vortex means to the low pressure section rather than to the heat exchanger while the high pressure section is idling, and means for feeding the second flow derived from the second vortex means to the condensing means without passing through the vapor generator while the high pressure section is idling.

14. The system of claim 8, wherein the second feedback means includes a flow path through the means for condensing, whereby the gas in the second feedback means is heated in the means for condensing by the latent heat of vaporization of the condensed fluid.

15. The system of claim 14 wherein the heat exchanger means of the second feedback means heats the second flow of the first vortex means in response to heat scavenged from other parts of the system.

16. The system of claim 7 wherein the heat exchanger means of the second feedback means heats the second flow of the first vortex means in response to heat scavenged from other parts of the system.

17. The system of claim 7 wherein the first and second feedback means include means for supplying gases having substantially the same pressure to the first vortex means inlet.

18. In combination, vortex tube means for separating a gaseous working fluid supplied to an inlet thereof into a high temperature first output gas flow and a low temperature second output gas flow, first and second gaseous flow feedback paths for said first and second output gas flows, each of said feedback paths terminating at a common junction and including means for maintaining said output flows in the gaseous state throughout the time while the flows are in them, said first feedback path including in a seriatim a first heat exchanger and compressor, said first heat exchanger being connected to be responsive to the first output gas flow and supplying the first output gas flow to said compressor, said second feedback path including a second heat exchanger for increasing the temperature of the second putput gas flow, and means for supplying the gaseous output flows of the compressor and second heat exchanger as the gaseous working fluid supplied to the inlet of the vortex means.

19. The combination of claim 18 wherein a load is included in said first feedback path.

* * * * *